(12) United States Patent
Zhang et al.

(10) Patent No.: US 11,789,639 B1
(45) Date of Patent: Oct. 17, 2023

(54) METHOD AND APPARATUS FOR SCREENING TB-SCALE INCREMENTAL DATA

(71) Applicant: ZHEJIANG LAB, Zhejiang (CN)

(72) Inventors: Hong Zhang, Hangzhou (CN); Yuan Liang, Hangzhou (CN); Tao Zou, Hangzhou (CN); Ruyun Zhang, Hangzhou (CN)

(73) Assignee: ZHEJIANG LAB, Hangzhou (CN)

(*) Notice: Subject to any disclaimer, the term of this patent is extended or adjusted under 35 U.S.C. 154(b) by 0 days.

(21) Appl. No.: 18/193,623

(22) Filed: Mar. 30, 2023

(30) Foreign Application Priority Data

Jul. 20, 2022  (CN) .......................... 202210854151.8

(51) Int. Cl.
*G06F 3/06* (2006.01)
*G06F 16/215* (2019.01)

(52) U.S. Cl.
CPC .......... *G06F 3/0652* (2013.01); *G06F 3/0608* (2013.01); *G06F 3/0673* (2013.01); *G06F 16/215* (2019.01)

(58) Field of Classification Search
CPC .... G06F 3/0652; G06F 3/0608; G06F 3/0673; G06F 16/215
See application file for complete search history.

(56) References Cited

U.S. PATENT DOCUMENTS

| 8,732,403 B1* | 5/2014 | Nayak | G06F 3/0619 |
| | | | 711/170 |
| 8,805,796 B1* | 8/2014 | Hu | G06F 3/0641 |
| | | | 707/692 |
| 9,715,434 B1* | 7/2017 | Xu | G06F 3/067 |
| 10,037,336 B1 | 7/2018 | Hu et al. | |
| 10,108,543 B1* | 10/2018 | Duggal | G06F 11/14 |

(Continued)

FOREIGN PATENT DOCUMENTS

| CA | 2823134 A1 * | 6/2013 | ......... G06F 16/1752 |
| CN | 102436408 A | 5/2012 | |

(Continued)

OTHER PUBLICATIONS

CN Notice Of Allowance(CN202210854151.8); dated Sep. 27, 2022.

(Continued)

*Primary Examiner* — Christopher D Birkhimer
(74) *Attorney, Agent, or Firm* — W&G Law Group

(57) ABSTRACT

A method and an apparatus for screening TB-scale of incremental data. In the present application, according to the memory capacity of the device, the raw data is divided into a plurality of raw data blocks, and the data is cleaned. By adopting a single-block index sorting algorithm, the de-duplicating ordering in the data blocks is completed without dropping operation, and the processed data blocks and a matrix hash index table are respectively generated and saved as initial data after completion. For the subsequent incremental data, the inter-block index-sorting algorithm is adopted, and the processed data blocks and the matrix hash index table are loaded in turn. The data is preliminarily screened on the basis of the matrix hash index table, and an incremental binary search algorithm is used for fine screening. Finally, the indexing and de-duplication screening of all data are completed.

9 Claims, 8 Drawing Sheets

(56) References Cited

U.S. PATENT DOCUMENTS

| | | | | |
|---|---|---|---|---|
| 10,108,544 | B1* | 10/2018 | Duggal | G06F 11/14 |
| 10,303,390 | B1* | 5/2019 | Colgrove | G06F 11/108 |
| 10,664,165 | B1* | 5/2020 | Faibish | G06F 3/0638 |
| 10,795,812 | B1* | 10/2020 | Duggal | G06F 3/067 |
| 2008/0144079 | A1* | 6/2008 | Pandey | H03M 7/30 |
| | | | | 358/1.15 |
| 2010/0077013 | A1* | 3/2010 | Clements | G06F 16/1748 |
| | | | | 707/822 |
| 2010/0088296 | A1* | 4/2010 | Periyagaram | G06F 16/183 |
| | | | | 707/E17.014 |
| 2010/0125553 | A1* | 5/2010 | Huang | G06F 11/1453 |
| | | | | 707/661 |
| 2010/0174881 | A1* | 7/2010 | Anglin | G06F 11/1453 |
| | | | | 711/E12.103 |
| 2010/0281081 | A1* | 11/2010 | Stager | G06F 9/5022 |
| | | | | 707/814 |
| 2010/0333116 | A1* | 12/2010 | Prahlad | G06F 3/0649 |
| | | | | 713/153 |
| 2011/0029497 | A1* | 2/2011 | Benhase | G06F 3/0608 |
| | | | | 707/698 |
| 2012/0041977 | A1 | 2/2012 | Kimura | |
| 2014/0114932 | A1* | 4/2014 | Mallaiah | G06F 3/0641 |
| | | | | 707/E17.032 |
| 2014/0237202 | A1* | 8/2014 | Yamamoto | G06F 3/061 |
| | | | | 711/162 |
| 2015/0205816 | A1* | 7/2015 | Periyagaram | G06F 11/1453 |
| | | | | 707/827 |
| 2015/0261776 | A1* | 9/2015 | Attarde | G06F 16/1748 |
| | | | | 707/664 |
| 2016/0350324 | A1* | 12/2016 | Wang | G06F 16/137 |
| 2017/0038978 | A1* | 2/2017 | Li | G06F 3/0611 |
| 2018/0314727 | A1* | 11/2018 | Epstein | G06N 5/01 |
| 2020/0310686 | A1* | 10/2020 | Truong | G06F 3/061 |
| 2021/0374021 | A1* | 12/2021 | Santhakumar | G06F 11/3485 |

FOREIGN PATENT DOCUMENTS

| | | |
|---|---|---|
| CN | 102495834 A | 6/2012 |
| CN | 102981933 A | 3/2013 |
| CN | 103116615 A | 5/2013 |
| CN | 103150397 A | 6/2013 |
| CN | 103646080 A | 3/2014 |
| CN | 104182453 A | 12/2014 |
| CN | 104573089 A | 4/2015 |
| CN | 105631003 A | 6/2016 |
| CN | 106446099 A | 2/2017 |
| CN | 106484770 A | 3/2017 |
| CN | 107402981 A | 11/2017 |
| CN | 107679158 A | 2/2018 |
| CN | 107807795 A | 3/2018 |
| CN | 109445702 A | 3/2019 |
| CN | 111625617 A | 9/2020 |
| CN | 112948169 A | 6/2021 |
| CN | 113282616 A | 8/2021 |
| CN | 113326289 A | 8/2021 |
| CN | 113505273 A | 10/2021 |
| CN | 13656397 A | 11/2021 |
| CN | 114064984 A | 2/2022 |
| CN | 114116612 A | 3/2022 |

OTHER PUBLICATIONS

CN First Office Action(CN202210854151.8); dated Sep. 5, 2022.
Hash-Index-and-Its-Application-Research-in-the-Data-Searching-on-Mobile-Terminal-of-Traffic-Police; Date of Mailing: Sep. 15, 2010.
Hierarchical-Index-of-High-Dimensional-Point-Data-Based-on-Self-Organizing-MAP; Date of Mailing: Jan. 30, 2003.

* cited by examiner

Loading the raw data to be screened into a memory according to a file pointer and a storage block size with an optimal length obtained by testing, respectively, marking to obtain a plurality of raw data blocks, and then cleaning the data based a data format, so as to remove the data that does not meet format requirements

Loading a zeroth raw data block into the memory, applying for an index classification storage area, distributing all the data in the zeroth raw data block to the corresponding classes in the index classification storage area, then performing index-sorting, deleting duplicate data after index-sorting, marking a zeroth raw data block as a processed data block, and generating a matrix hash index table according to the processed data block

Index-sorting on incremental data, and completing de-duplicating sorting of other raw data blocks by single-area index-sorting; screening the raw data blocks by querying the matrix hash index table, taking a piece of data from the raw data blocks to query the matrix hash index table; if query does not hit, retaining the piece of data and continuing to process a next piece of data of the raw data blocks; and if the query hits, which indicates that the piece of data from the raw data blocks is, or possibly is duplicated, continuing to search the raw data blocks in the processed data blocks by a starting point increment binary method; discarding the data if they are completely duplicate, and retaining the data if they are not.

Retaining non-duplicate processed data blocks sorted in the step (3), and taking all the non-duplicate processed data blocks as data screening results.

FIG. 1

METHOD AND APPARATUS FOR SCREENING TB-SCALE INCREMENTAL DATA

CROSS-REFERENCE TO RELATED APPLICATIONS

The present application claims priority to Chinese Patent Application No. 202210854151.8, filed on Jul., 20, 2022, the content of which is incorporated herein by reference in its entirety.

TECHNICAL FIELD

The present field belongs to the field of large-scale computing, in particular to a method and an apparatus for screening Terabytes-scale (TB-scale) of incremental data, which screen and process big data before large-scale computing to meet the requirements of large-scale computing.

BACKGROUND OF THE INVENTION

Before the scientific calculation of large-scale supercomputers is implemented, it is necessary to clean and screen the collected massive data. How to screen the data set described by users from the collected massive data is very important. Because the amount of data processed is over a TB level, traditional data processing and screening are mostly processed on large-scale computers or distributed servers. Because the data cleaning and screening operation is IO-intensive, CPU computing power and precious computing resources are wasted. Traditional data screening methods, such as Hill sorting, index classification and the like limit the scale of data processing. According to the existing technical means, screening data takes up a large amount of computing space of CPU every time, so the efficiency is low, and the scale of processed data cannot reach TB level, which cannot meet the requirement of screening data before scientific calculation.

If the data can be screened and processed by the server at the front end of data collection, and the data processing can be completed at the front end, there is no solution that can meet the above requirements in the current prior art, so it is urgent to design a method that can process TB-scale data on the server.

SUMMARY OF THE INVENTION

In view of the shortcomings of the prior art, the present application provide a method and an apparatus for screening Terabytes-scale (TB-scale) of incremental data.

In order to achieve the above object, the present application is realized by the following technical solution: a first aspect of the embodiment of the present application provides a method for screening TB-scale incremental data, which specifically includes the following steps:

(1) preprocessing of raw data blocks: respectively loading the raw data to be screened into a memory according to a file pointer and a storage block size with an optimal length obtained by testing, marking to obtain a plurality of raw data blocks, and then cleaning the data on the basis of a data format, so as to remove the data that does not meet format requirements;

(2) single-block index sorting: loading a zeroth raw data block into the memory, applying for an index classification storage area, distributing all the data in the zeroth raw data block to the corresponding classes in the index classification storage area, then performing index-sorting, deleting duplicate data after index-sorting, marking a zeroth raw data block as a processed data block, and generating a matrix hash index table according to the processed data block;

(3) inter-block index-sorting and de-duplicating: performing index-sorting on incremental data, and completing de-duplicating sorting of other raw data blocks by single-block index sorting; screening the raw data blocks by querying the matrix hash index table, taking a piece of data from the raw data blocks to query the matrix hash index table, and if query does not hit, directly retaining the piece of data and continuing to process a next piece of data of the raw data blocks; if the query hits, which indicates that the piece of data from the raw data blocks is, or possibly is duplicated, continuing to search the raw data blocks in the processed data blocks by a starting point increment binary method; discarding the data if they are completely duplicate, and retaining the data if they are not;

(4) non-duplicated result retaining: retaining non-duplicate processed data blocks sorted in step (3), and using all the non-duplicate processed data blocks as data screening results.

A second aspect of the embodiment of the present application provides an apparatus for screening TB-scale incremental data, comprising one or more processors for implementing the above method for screening TB-scale incremental data.

A third aspect of the embodiment of the present application provides a computer-readable storage medium on which a program is stored. In an embodiment, the program, when executed by a processor, is configured to implement the above method for screening TB-scale incremental data.

The method has the advantages that the memory resource is fully utilized, and a plurality of raw data blocks are preprocessed; the raw data blocks are classified and de-duplicated and then marked as processed data blocks, and a matrix hash index table is generated according to the one-to-one correspondence of the processed data blocks; for the newly added raw data blocks, the raw data blocks are screened based on the matrix hash index table to retain the non-duplicate data, and the preliminary screening is realized. For some data with similar contents, a binary fast search method is used to accurately check the duplicate. After the processed data blocks are traversed for the raw data blocks, the sorted non-duplicate raw data is retained as the screening result and recorded as the processed data blocks, and all the processed data blocks are the whole results. The above technology reduces the access times and time of hard disk storage devices, integrates data access and calculation, and realizes TB-scale data screening processing, and its processing efficiency is improved several times to dozens of times compared with traditional methods.

BRIEF DESCRIPTION OF DRAWINGS

FIG. 1 is a flowchart of the method of the present application;

DETAILED DESCRIPTION OF THE INVENTION

In order to make the purpose, technical solution and advantages of the embodiment of the present application clearer, the technical solution in the embodiment of the present application will be clearly and completely described below with reference to the drawings in the embodiment of the present application. The features in the following embodiments and implementations can be combined with each other without conflict.

Figure 2:
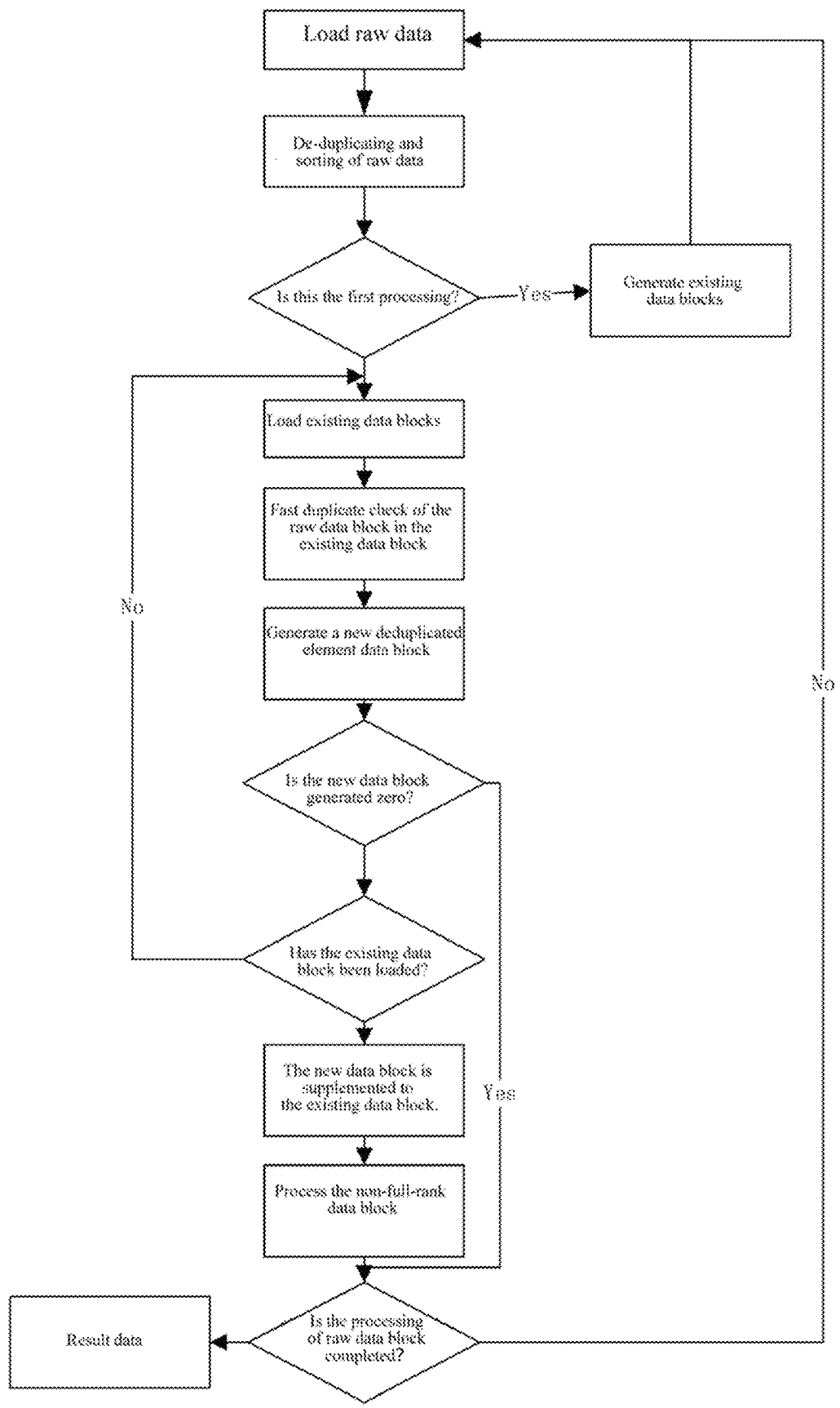
FIG. 2 is the overall flow chart of incremental data screening method.

As shown in FIG. 1 and FIG. 2, the present application proposes a method for screening TB-scale incremental data, which is realized by four steps: preprocessing of raw data blocks, single-block index sorting, inter-block index-sorting, and non-duplicate result retention. Specifically, the method includes the following steps:

(1) Preprocessing of raw data blocks: loading the raw data to be screened into the memory according to the file pointer and the size of the storage block with an optimal length obtained by testing, marking the data to obtain a number of raw data blocks (RawDataBlocks), cleaning the data based on the data format, removing illegal data that does not meet the format requirements, and applying for the memory required for index-sorting.

The step includes the following specific sub-steps:

(1.1) The capacity of the server equipment is optimally tested, with no memory page shortage and thrashing as the standard, and the memory blocks with optimal length are obtained; the raw data blocks (RawDataBlocks) are optimally cut into memory blocks according to the memory capacity, and the raw data blocks (i.e., memory blocks) with optimal length are read into the memory every time. According to the test, the embodiment of the present application sets the size of the memory block with the optimal length between 0.5 G and 2.2 G as the best.

(1.2) The raw data block size is set as RAWDATALEN, the raw data are read according to the file pointer and the storage block with the optimal length, and set as $RawDataBlock_0$, $RawDataBlock_1$, . . . $RawDataBlock_{M-1}$, and then the data format is checked. If the data does not meet the format requirements, the part that does not meet the format is cleaned out.

(1.3) After data block cutting and data cleaning, the memory needed for index-sorting is applied.

The result file of the zeroth raw data block $RawDataBlock_0$ after single-block indexing is marked as the zeroth processed data block $ProcessedDataBlock_0$, and the subsequent ones are respectively $ProcessedDataBlock_1$, . . . $ProcessedDataBlock_{N-1}$, and a one-to-one corresponding matrix hash index table is generated for each processed file and marked as $MatrixHashTable_0$, . . . , $MatrixHashTable_{N-1}$. During data processing, the memory to be applied for is the memory for reading the raw data block RawDataBlock, the memory IndexArray for storing index area RawDataBlock, the memory for the processed data block ProcessedDataBlock and the memory for matrix hash index table MatrixHashTable. If the memory application fails, the strategy should be adjusted according to the system memory.

Figure 3:
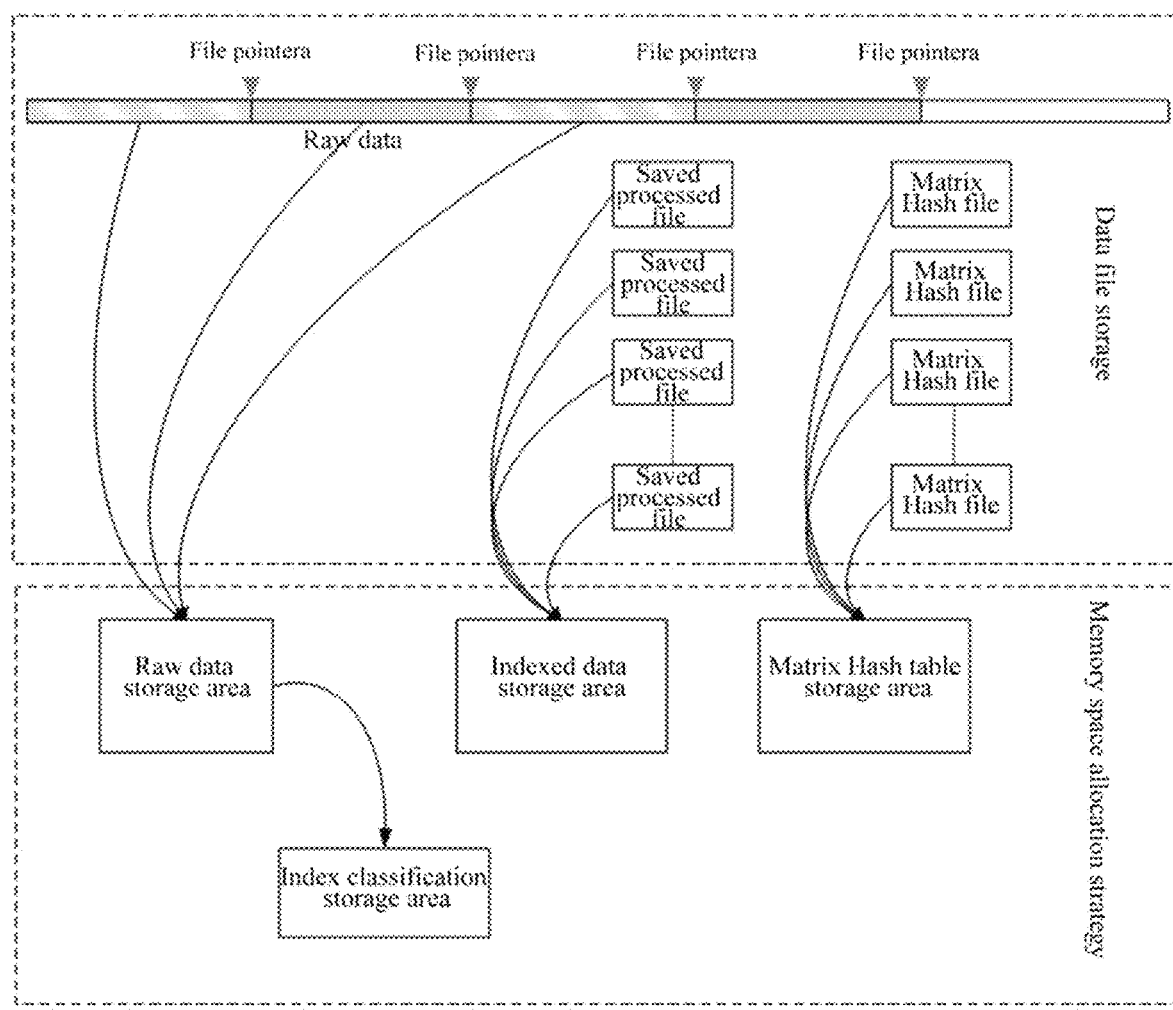
FIG. 3 is a storage and memory allocation strategy diagram.

The memory application logic is shown in FIG. 3. In the single-block index sorting process, the raw data block, the index area, the processed data block and the matrix hash table need to be read into the memory at the same time, and the memory application should be made in advance, so as to prevent the task from failing due to insufficient memory when the preprocessing work has been done before.

(2) Single-block index sorting: loading a zeroth raw data block into the memory, applying for an index classification storage area IndexArray, distributing all the data in the zeroth raw data block to the corresponding classes in the index classification storage area IndexArray, then performing index-sorting, deleting duplicate data after index-sorting, marking a zeroth raw data block as processed data blocks ProcessedDataBlocks, and generating matrix hash index tables MatrixHashTables according to the processed data blocks.

Furthermore, the matrix hash index table is in one-to-one correspondence with the processed data blocks, and is used for hit query of incremental data.

Figure 4:
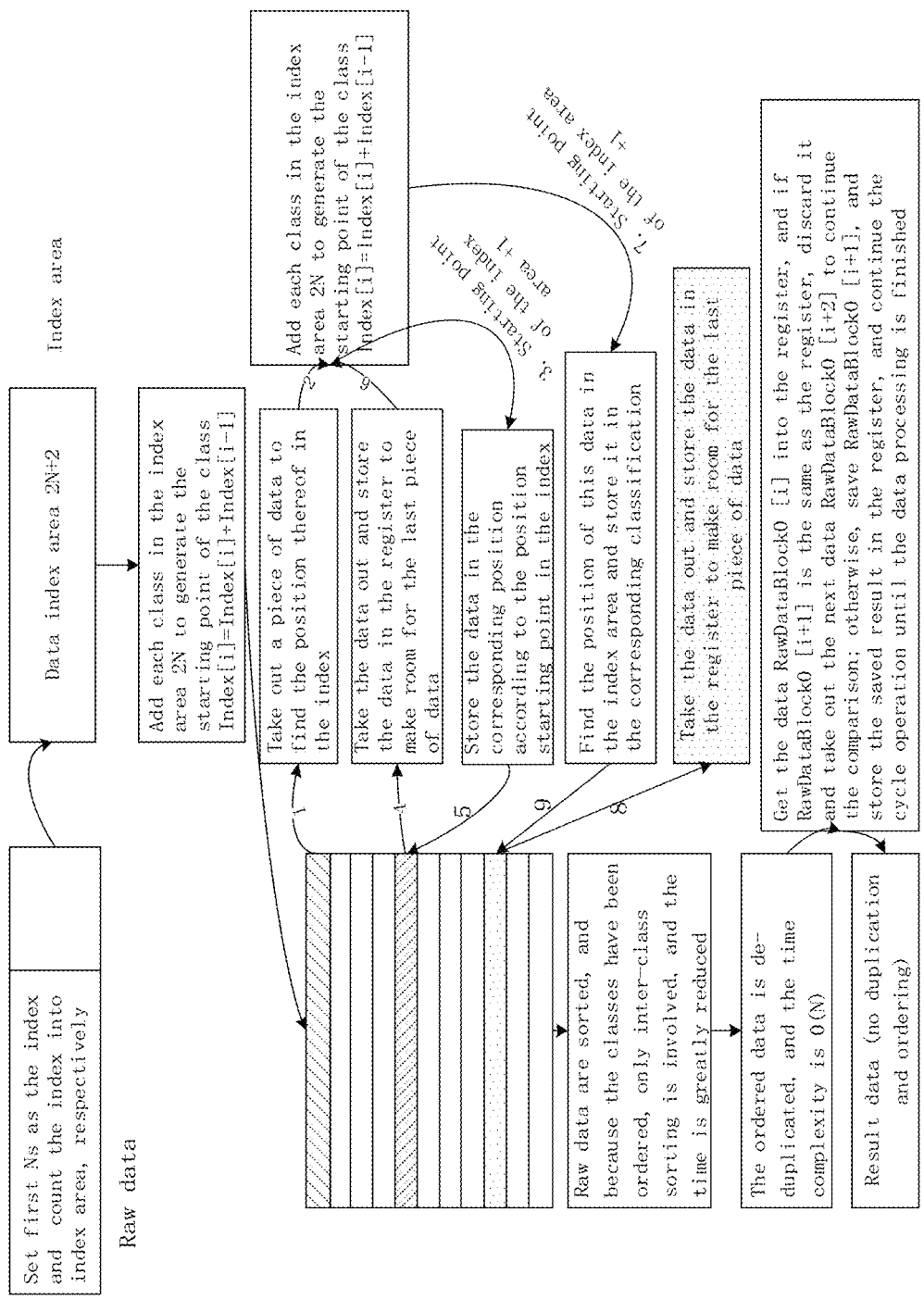
FIG. 4 is the schematic diagram of the single-block index sorting and de-duplicating processing method for raw data blocks.

The step (2) specifically includes the following sub-steps:

(2.1) as shown in FIG. 4, the raw data blocks are screened and deduplicated by single-zone index classification, and marked as ProcessedDataBlocks, specifically including the following sub-steps:

(2.1.1) the zeroth raw data block $RawDataBlock_0$ is loaded into the memory for storage, and the data length is set as RawDataLen, the index area is set as IndexArray, and the binary length of the index area is IndexLen.

(2.1.2) an index classification storage area with a memory length of $2^{IndexLen}+2$ is applied for the index area IndexArray.

(2.1.3) the index classification storage area is cleared to 0, and the binary BITs of the first binary length IndexLen of each piece of data in the zeroth raw data block $RawDataBlock_0$ is taken out, and counted in the index classification storage area for classification, namely, $IndexArray[ClassNum_0]$, $IndexArray[ClassNum_1]$, . . . , $ndexArray[ClassNum_{2^{IndexLen}-1}]$, and after statistics, the data are divided into $2^{IndexLen}$ classes (ClassNum) according to the BITs of the binary length IndexLen. In an embodiment, each cell stores the statistical quantity of this class.

(2.1.4) the statistical values of in the index area IndexArray are accumulated and summed according to the classification from the starting point order to obtain the cumulative starting point of each kind of data stored in sequence.

Specifically, the $i^{th}$ item and $i+1^{th}$ item of each unit in the index area IndexArray are cumulatively stored in the $i+1^{th}$ item unit, where i=0,1, . . . , n; for example: 0, $ClassNum_0$, $ClassNum_0+ClassNum_1$, $ClassNum_0+ClassNum_1+ClassNum_2$, . . . ; finally, the cumulative starting point of sequential storage of each type of data is obtained.

(2.1.5) The data are sequentially taken out from the zeroth raw data block $RawDataBlock_0$ for processing, the first piece of data that has been taken out is denoted as P, the BITs of the first IndexLen are taken out from the first piece of data P and are set as $ClassNum_m$; the index area table IndexArray $[ClassNum_m]$ is searched to obtain the starting position of the classification $ClassNum_m$. If the first data is in the starting position of the current partition, a piece of data is directly taken and one is added to the starting position of the classification $ClassNum_m$, that is, $IndexArray[ClassNum_m]+1$; if the first data P is not in the starting position of the classification $ClassNum_m$, the data in the starting position is taken out and set as the second data Q, the first data P is put in the position of the second data Q, that is, the position of the class where the second data Q belongs, IndexArray

[ClassNum$_m$], and one is added to the starting position of the classification ClassNum$_m$, that is, IndexArray[ClassNum$_m$]+1, where the time complexity of this classification operation is O(N).

(2.1.6) The operation of step (2.1.5) is repeated for the second data Q, that is, the BITs of the first IndexLen in the second data Q are taken out, the index area table IndexArray [IndexLenBIT] is searched to find its classified position, the data in this position are taken out and set as ClassNum$_n$; the index area table IndexArray[ClassNum$_n$] is searched to take out the unit data as the third data S; the second data Q are put in the position of the third data S, that is, the position of the class to which the third data S belongs, IndexArray [ClassNum$_n$], and one is added to the starting position of the classification ClassNum$_n$, that is, IndexArray[ClassNum$_n$]+1, until all data are processed. After all operations are completed, all the data have been distributed to the corresponding classes according to the index of the BITs of the first IndexLen.

(2.1.7) Traditional sorting operations are carried out on all the data obtained after the classification in step (2.1.6), such as bubble sorting and shell sorting, etc. Because the classes have been ordered, the amount of calculation will be greatly reduced. The more classifications, the more uniform the data, and the amount of calculation will be greatly reduced. The original engineering quantity is O(RawDataLen*log$_2$RawDataLen), and the engineering quantity after classification index is shown in the following formula:

$$\sum_{ClassNum_0}^{ClassNum_2 IndexLen_{-1}} O(ClassNum_n * \log_2 ClassNum_n).$$

(2.1.8) The index-sorting data obtained in step (2.1.7) is deduplicated; all operations are completed in the zeroth raw data block RawDataBlock$_0$. RawDataBlock$_0$ [i] is taken out to the Register; if RawDataBlock$_0$ [i+1] is the same as the Register, the next data will be discarded and the comparison will continue; if it is different, RawDataBlock$_0$ [i+1] will be stored in the Register, and the cyclic operation will continue until the data processing is finished, and the ordered data blocks without repetition will be obtained. Keeping the data blocks in order is to ensure the binary search. The zeroth raw data block after processing is treated as the zeroth processed data block.

Figure 5:
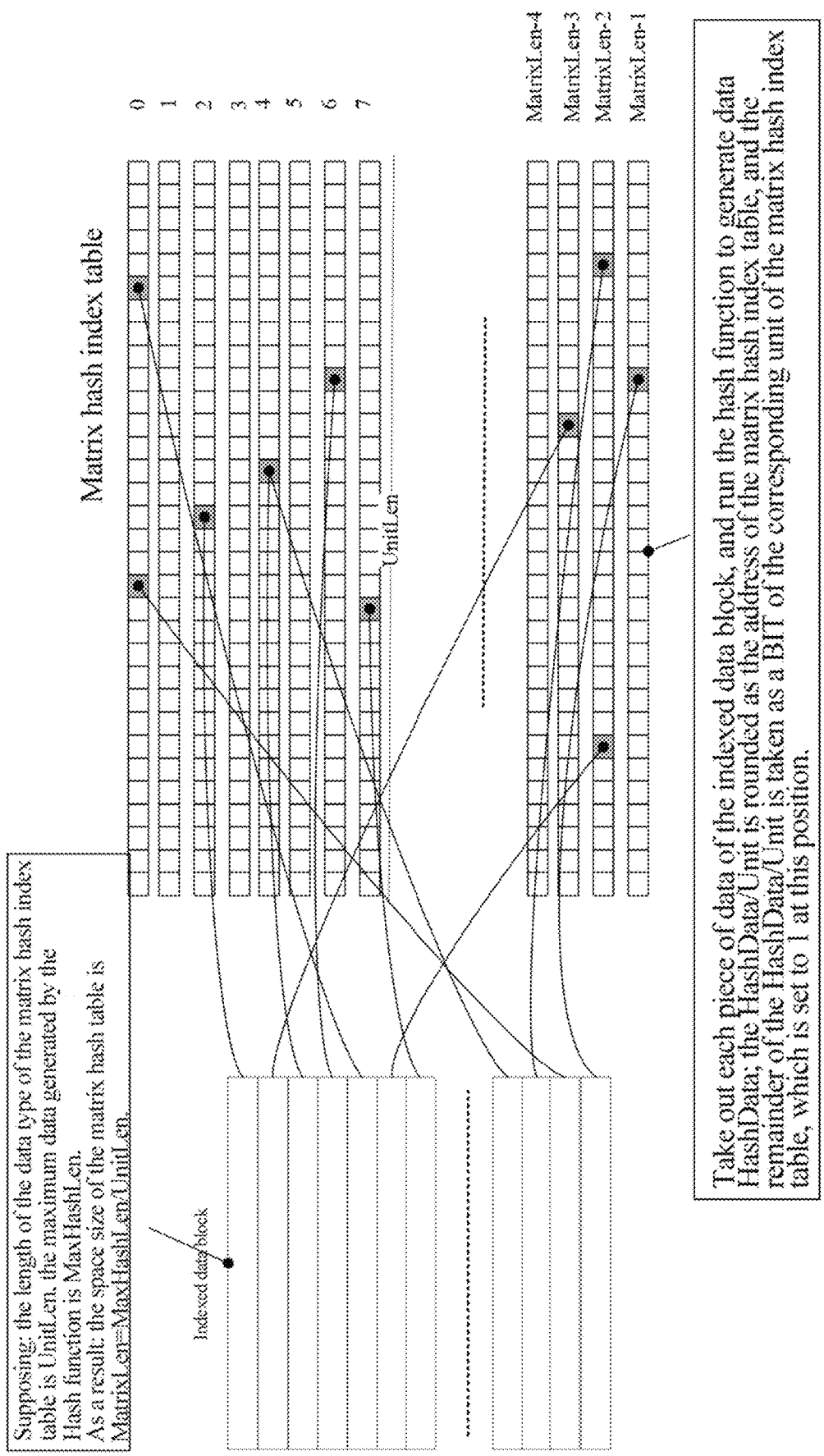
FIG. 5 is a schematic diagram of a method for constructing a matrix hash index table.

(2.2) As shown in FIG. 5, a matrix hash index table is generated according to the processed data blocks.

A hash function is set for the processed data block to generate a matrix hash index table. The requirements to be met in the construction of the hash function include that the hash function takes less time, logical operations and addition and subtraction operations should be used as much as possible, the keywords to be hashed for the processed data block should be selected as completely as possible, the hash values should be evenly distributed, and the size of the hash table should be moderate, which should not occupy too much memory space. If the data generated by the hash function is 22 bits, 64-bit unsigned long shaped storage space of 65,536 units ($2^{22}$=8388608/64). The distribution of keywords should be uniform, etc. Every processed data block needs to generate a matrix hash index table. When the processed data block changes, the matrix hash index table also needs to be regenerated.

The step includes the following specific sub-steps:

(2.2.1) the processed data block is set to be ProcessedDataBlock, and the data length is set to be ProcessedDataLen, the matrix hash index table is ser to be MatrixHashLen, the hash binary length value of the index is set to be MatrixLen.

(2.2.2) a matrix index area is applied for the matrix hash index table MatrixHashTable, the length of which is MatrixArray=$2^{MatrixLen/data\ type\ length}$ (according to long integer 64 bits/integer 32 bits).

(2.2.5) the matrix hash index table MatrixHashTable is initialized (that is, clear the matrix hash index table MatrixHashTable to 0), the binary BITs of the Hash binary length value MatrixLen generated by each piece of data of the zeroth processed data block ProcessedDataBlock$_0$ through the Hash function transformation is taken out (it can also be directly selected from any BITs at the head or tail, which is determined by the difference between the maximum value and the minimum value in the processed data block ProcessedDataBlock of the processed data area); the intercepted BIT data of the hash binary length value MatrixLen is divided by the data type length; the rounding part is used as the address of the matrix hash index table MatrixHashTable, and the remainder part is set to 1 at the corresponding BIT in the matrix hash index table MatrixHashTable. All data of the processed data block Processed Data Block shall be set with 1 information at the corresponding position of the corresponding matrix hash index table MatrixHashTable to generate a matrix hash index table, which is the index file of the processed data block Processed Data Block to form a data block pair and save the file. See FIG. 5 for details. The matrix hash index table can greatly compress the search space.

(3) Inter-block index-sorting: index-sorting incremental data, and completing de-duplicating sorting of other raw data blocks by single-block index sorting; screening the raw data blocks by querying the matrix hash index table, taking a piece of data from the raw data blocks to query the matrix hash index table, and if query does not hit, directly retaining the piece of data and continuing to process a next piece of data of the raw data blocks; if the query hits, which indicates that the piece of data from the raw data blocks is, or possibly is duplicated, continuing to search the raw data blocks in the processed data blocks by a starting point increment binary method; discarding the data if they are completely duplicate, and retaining the data if they are not.

In an embodiment, the raw data block and the processed data block are screened based on the matrix hash index table, and inter-block index-sorting is performed. For incremental data, it is used for index-sorting of incremental data starting from the second raw data block. Firstly, single-block index sorting is adopted to complete the de-duplication and sorting of the incremental data block itself; the matrix hash index table and the processed data block are respectively loaded; the matrix hash index table is firstly queried, and if there is no duplication, that is, the BIT is 0, then the data is not duplicate, and is directly retained, and processing of the next data is continued; if the BIT is 1, a starting point increment binary search method is adopted to continue searching in the processed data block; if the data is not duplicate, it will be retained; if it is completely duplicate, it is deleted. The binary search method realizes the great compression of search space. Because the raw data blocks are in order, when a duplicate is found in the processed data blocks, the search starting point of the raw data blocks in the processed data blocks is changed from the point where duplicates are found as the starting point, thus greatly reducing the search space. As the data is gradually reduced in the screening process, the data of the raw data blocks without duplicates in the processed data blocks are still stored in the raw data blocks in turn, and the next processed data blocks and the matrix hash index table are continuously loaded. The above operation is repeated until the raw data block is compared with all the processed data blocks. Finally, index-sorting and de-duplicating of all data are completed.

Figure 6:
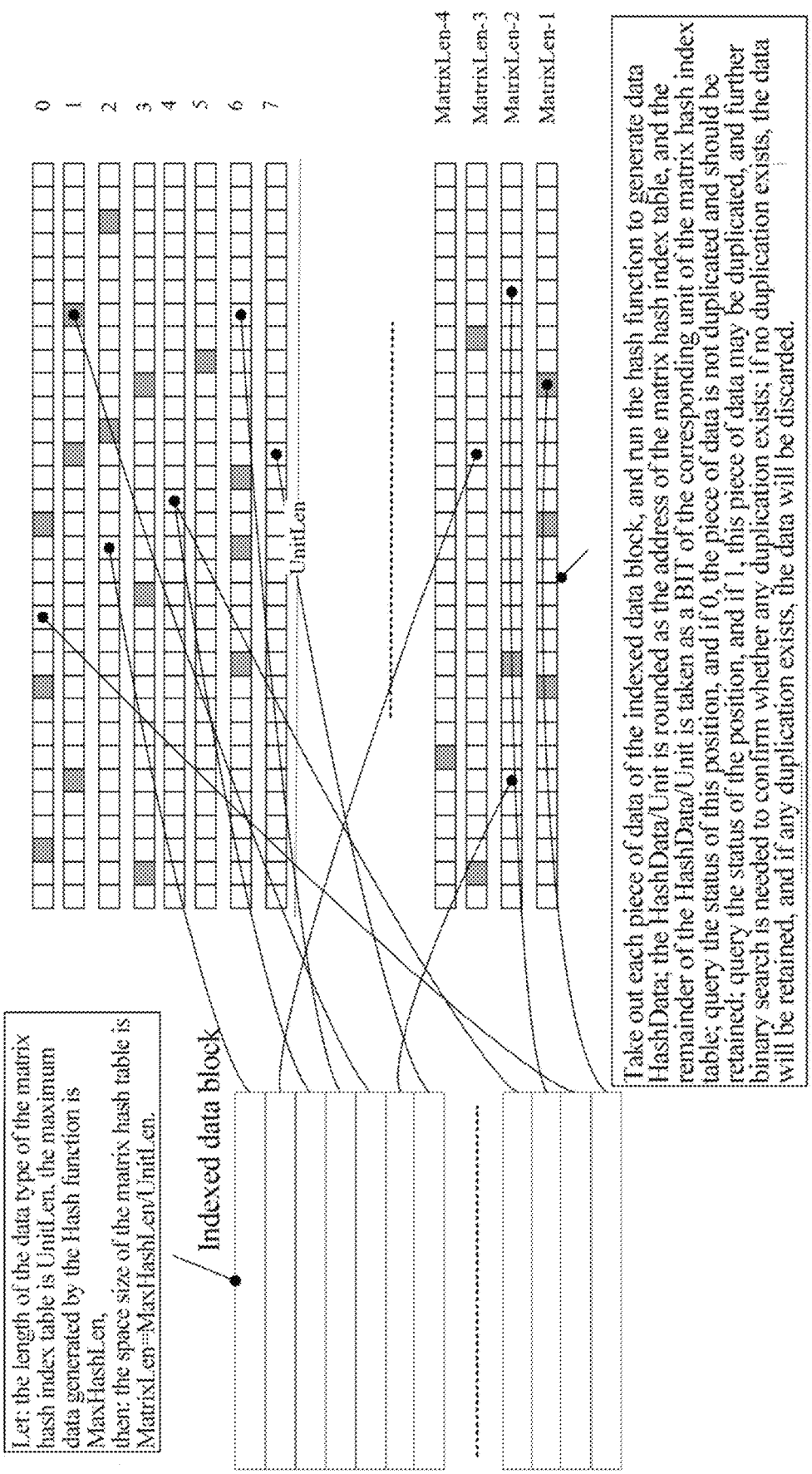
FIG. 6 is an illustration of the principle of rapid screening using matrix hash index table.

The process of screening the raw data block and the processed data block through the matrix hash index table is specifically as follows:

The raw data block RawDataBlock, the matrix hash index table MatrixHashTable and the processed data block ProcessedDataBlock are all loaded into the memory. Firstly, the raw data block is preprocessed according to the single block index-sorting method to realize ordering without duplication; a piece of data is taken out from the raw data block respectively, and from this data, the BIT of MatrixLen is generated by running the same hash function as in the step of generating matrix hash index table; the generated BIT data of MatrixLen is divided by the data type length, and the rounding part is used as the address of MatrixHashTable, and the remainder part is used as the corresponding BIT in MatrixHashTable. It is checked whether the BIT is 1; if it is 0, it proves that there is no duplication, and the result directly retained, and the data processing of the next raw data block will be continued; if the BIT is 1, there may be duplication, and the starting point increment binary search algorithm will be used to continue to determine whether the data record already exists. See FIG. 6 for details.

The raw data block and the processed data block are searched and screened by starting point increment binary search method, specifically:

(a) After a piece of data taken out from the raw data block RawDataBlock is subjected to matrix hash indexing, if it is not negated, the binary search method will continue to be used for searching.

(b) A piece of data is subjected to binary search in the ProcessedDataBlock. If it is less than the minimum value of the processed data or greater than the maximum value of the processed data, it directly indicates that there is no duplication.

(c) The interval of the first search for ProcessedDataBlock is set to 0—ProcessedDataBlockLen-1; because the raw data block RawDataBlock has been sorted and deduplicated to be ordered data, when a duplicate is found for the first data finds in the corresponding position of the processed data block ProcessedDataBlock (set as ProcessedDataBlockMid), the subsequent search space becomes ProcessedDataBlock-Mid—ProcessedDataBlockLen-1. Similarly, every time a duplicate is found, the search space decreases progressively.

(d) After the data of the raw data block RawDataBlock is screened for the processed data block ProcessedDataBlock, the data for which no duplicateis found in the raw data block is still stored in the RawDataBlock in sequence. Because the retained non-duplicate data shows a decreasing trend compared with the raw data, the storage space can be reused in the same space, and the search for the next ProcessedData-Block can be continued.

(e) The RawDataBlock data still retained after a round of searching will continue to be searched and negated in the matrix hash index tables MatrixHashTable$_1$ . . . MatrixHash-Table$_{N-1}$, while the non-negated data will continue to be searched in the processed data blocks ProcessedData-Block$_1$, . . . ProcessedDataBlock$_{N-1}$. The screening of one raw data block is finished when the screened raw data block is 0, and the next raw data block will be loaded to continue the screening. When all the duplicates are still retained after screening, the remaining data is the result data. According to the length of duplicates, the screening speed will be faster and faster as the number decreases.

(4) Non-duplicate result retention: the non-duplicate processed data blocks sorted in step (3) are retained and all the non-duplicate processed data blocks are used as data screening results.

Figure 7:
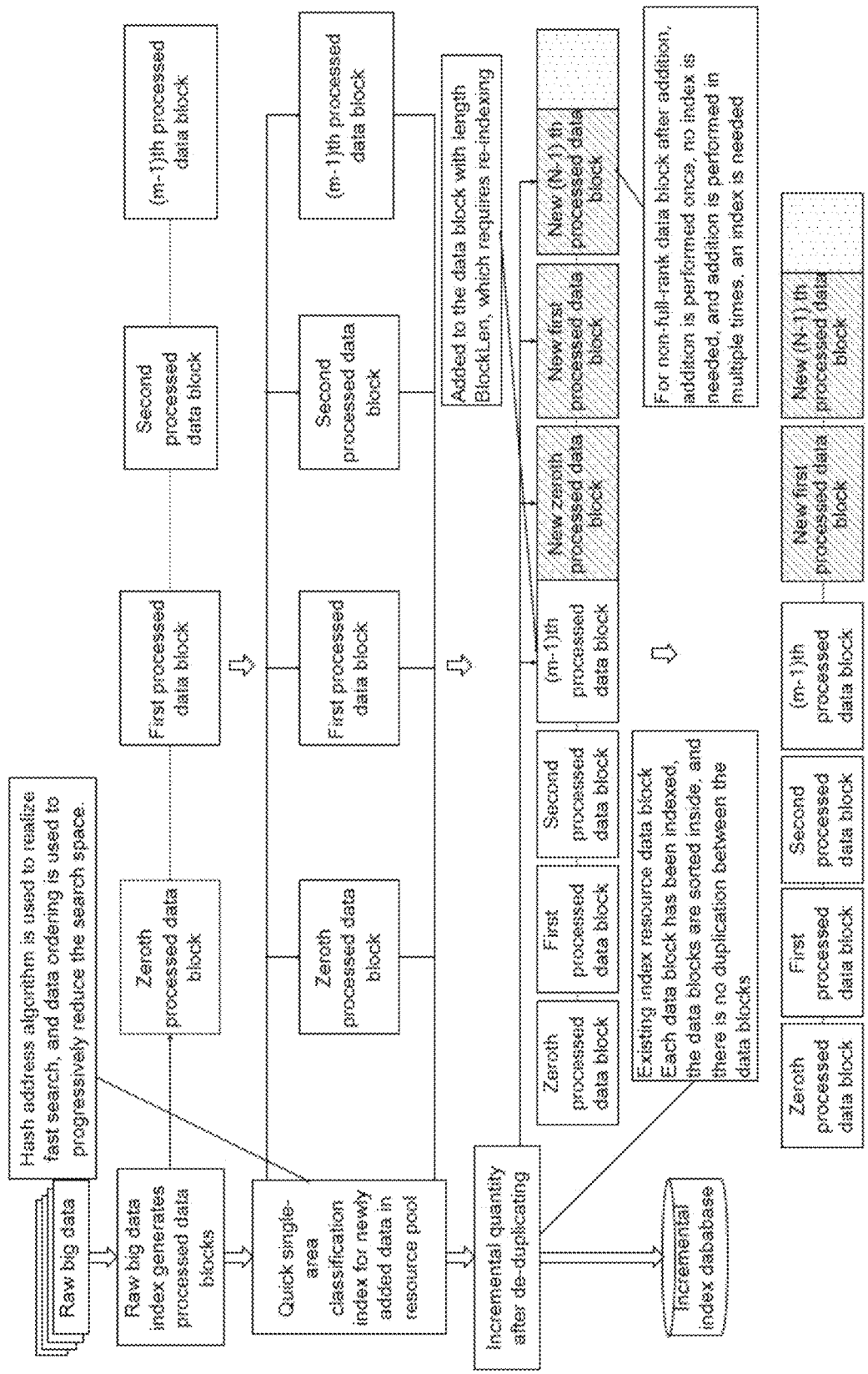
FIG. 7 is a schematic diagram of block indexing and tail processing of screening results.

If the second raw data blocks all find duplicates in the processed data blocks, the raw data block is discarded and processing of the next raw data block is continued. After all the processed data blocks are searched, the remaining data in the raw data block is the non-duplicate retained data. The retained data will be appended to the tail of the processed data block, and become a new data block after meeting the defined length. The newly generated data block will be subjected to single-block index sorting (no duplication is needed, no duplication is needed) to become a full-rank processed data block, and the original technical investigation hash index table will be replaced by a new matrix hash index table. As shown in FIG. 7, the remaining tail part exceeding the defined length generates the last non-full-rank processed data block (which has been sorted and has no duplicates), and a matrix hash index table also needs to be generated. It is necessary to carry out indexing, classification and sorting on the processed data blocks supplemented with data and the tail of the non-full-rank processed data blocks (without de-duplicating). The step includes the following specific sub-steps:

(4.1) If the screening result is zero, the raw data block will continue to be loaded until the processing is finished.

(4.2) After screening, the retained results are stored in the tail of the ProcessedDataBlockN-1, and when BLOCKLEN is satisfied, a new processed data block is generated, and the newly generated processed data block is subjected to single-block index sorting processing (without duplication removal). At the same time, a matrix hash index table MatrixHashTable is generated, and the processed data blocks correspond to the matrix hash index table, and are saved into data files respectively, and the number of processed data blocks and the total number of BLOCKLEN are increased by 1.

(4.3) The remaining tail is processed according to step (4.2), and finally non-full-rank processed data block ProcessedDataBlock$_{N-1}$ and the matrix hash index table MatrixHashTable$_{N-1}$ w are generated. The statistical number of processed data blocks is increased by 1, and the algorithm time complexity is O(N) function.

It should be further explained that the method of the present application is sensitive to the memory capacity of the equipment, and when the memory space of the equipment is too small, the effective operation of the present application cannot be met or the efficiency of the method of the present application can be affected. Secondly, the present application is also sensitive to the space requirement of the matrix hash index table. When the space of the matrix hash index table is too small, most of the BITs will be 1, and the purpose of primary coarse-grained screening cannot be achieved. Finally, the present application has obvious I/O-intensive access characteristics, and if the apparatus is equipped with higher-performance I/O access devices, such as solid state hard disk SSD, the screening efficiency can be greatly improved.

Corresponding to the aforementioned embodiment of the method for screening TB-scale incremental data, the present application also provides an embodiment of an apparatus for screening TB-scale of incremental data.

Figure 8:
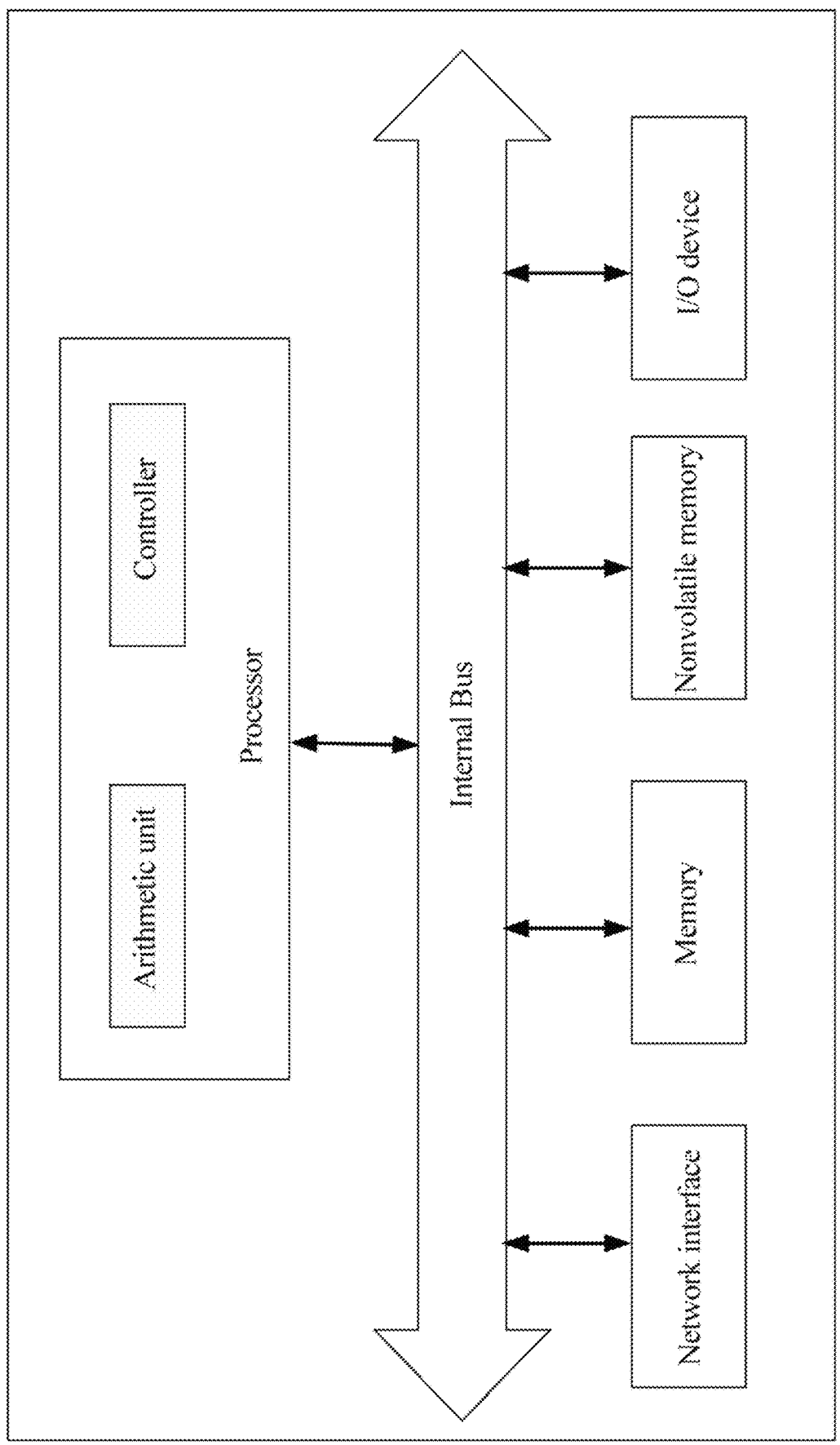
FIG. 8 is a structural block diagram of an apparatus for screening TB-scale incremental data provided by the embodiment of the present application.

Referring to FIG. 8, an apparatus for screening TB-scale of incremental data provided by an embodiment of the present application includes one or more processors, which are used to implement the method for screening TB-scale incremental data in the above embodiment.

The embodiment of the apparatus for screening TB-scale incremental data of the present application can be applied to any device with data processing capability, and any device with data processing capability can be a device or apparatus such as a computer. The embodiment of the apparatus can be realized by software, or by hardware or a combination of hardware and software. Take the software implementation as an example, as a logical apparatus, it is formed by reading the corresponding computer program instructions in the nonvolatile memory into the memory through the processor of any device with data processing capability. From the aspect of hardware, as shown in FIG. 8, it is a hardware structure diagram of any apparatus with data processing capability where the apparatus for screening TB-scale incremental data of the present application is located. In addition to the processor, memory, network interface, nonvolatile memory and I/O storage interface shown in FIG. 8, any device with data processing capability where the apparatus is located in the embodiment can usually include other hardware according to the actual functions of any device with data processing capability, which will not be described here again.

The realization process of the functions and functions of each unit in the above-mentioned apparatus is detailed in the realization process of the corresponding steps in the above-mentioned method, which is not repeated here.

As for the apparatus embodiment, it basically corresponds to the method embodiment, so please refer to the part of the description of the method embodiment. The above-described apparatus embodiment is only schematic, in which the units described as separate components may or may not be physically separated, and the components displayed as units may or may not be physical units, that is, they may be located in one place or distributed over multiple network units. Some or all of the modules can be selected according to the actual needs to achieve the purpose of the solution of the present application. Those skilled in the art can understand and implement it without creative labor.

An embodiment of the present application also provides a computer readable storage medium on which a program is stored, which, when executed by a processor, realizes the method for screening TB-scale incremental data in the above embodiment.

The computer readable storage medium can be the internal storage unit of any apparatus with data processing capability as described in any of the previous embodiments, such as a hard disk or a memory. The computer-readable storage medium can also be any device with data processing capability, such as plug-in hard disk, Smart Media Card (SMC), SD card, Flash Card and the like equipped on the apparatus. Furthermore, the computer-readable storage medium can also include both the internal storage unit and the external storage apparatus of any apparatus with data processing capability. The computer readable storage medium is used to store the computer program and other programs and data required by any apparatus with data processing capability, and can also be used to temporarily store data that has been output or will be output.

The invention claimed is:

1. A method for screening Terabytes-scale (TB-scale) of incremental data, comprising:

step (1) preprocessing of a raw data block: loading the raw data to be screened into a memory according to a file pointer and a storage block size with an optimal length obtained by testing, respectively, marking to obtain a plurality of a raw data block, and then cleaning data based on a data format, so as to remove data that does not meet format requirements;

step (2) single-block index sorting: loading a zeroth raw data block into the memory, applying for an index classification storage area, distributing all the data in the zeroth raw data block to corresponding classes in the index classification storage area, then index sorting, de-duplicating data after index-sorting, marking the zeroth raw data block as a processed data block, and generating a matrix hash index table according to the processed data block;

step (3) inter-block index sorting and de-duplicating: index sorting incremental data, and completing de-duplicating sorting of other raw data blocks by single-block index-sorting; screening the raw data blocks by querying the matrix hash index table, taking a piece of data from the raw data blocks to query the matrix hash index table; if query does not hit, directly retaining the piece of data and processing a next piece of data of the raw data blocks; and if the query hits, which indicates that the piece of data from the raw data blocks is, or possibly is partially duplicated, searching the raw data blocks in the processed data blocks by a starting point increment binary search method; and if they are completely duplicate, discarding the data, and if they are not duplicated retaining the data;

wherein the starting point incremental binary search method comprises: binary-searching a piece of data in the processed data area, no duplication exists when the piece of data is less than a minimum value or greater than a maximum value; since the raw data block is ordered data, a searching interval decreases successively when searching in the processed data block; after the processed data block is screened, storing raw data not to be duplicated in the processed data block in the raw data block in sequence, and searching in a next processed data block; loading the next processed data block and the matrix hash index table into a memory storage area, searching and negating a raw data block that remains after a round of searching in the loaded matrix hash index table, and binary-searching non-negated data in the processed data area, when a screened raw data block is 0, screening for one raw data block is finished, and a next raw data block is loaded for further screening; wherein remaining data after traversing all processed data blocks for one raw data block is non-duplicate data, namely data to be retained, and remaining data after screening of all raw data blocks is result data;

step (4) non-duplicate result retaining: retaining non-duplicate processed data blocks sorted in the step (3), and taking all the non-duplicate processed data blocks as data screening results.

2. The method for screening TB-scale of incremental data according to claim 1, wherein the step (1) further comprises applying for the memory required for index-sorting, and said applying for the memory required for index-sorting comprises: recording a result of raw data blocks after single-block index de-duplicating as processed data blocks, and generating a matrix hash index table corresponding to each processed data block one by one; dividing the required memory into a raw data storage area, an index classification storage area, a processed data storage area and a matrix hash table storage area; reading all the raw data blocks, processed data blocks and matrix hash index tables into the memory, and applying for memory in advance.

3. The method for screening TB-scale of incremental data according to claim 1, wherein a process of classifying, de-duplicating and marking the raw data blocks as processed data blocks in the step (2) comprises:

step (2.1.1) loading the zeroth raw data block into the memory to be stored, wherein a data length is set to be RawDataLen, an index area is set to be IndexArray, and a binary length of the index area is set to be IndexLen;

step (2.1.2) applying for an index classification storage area of $2^{IndexLen}+2$ for the index area IndexArray;

step (2.1.3) clearing the index classification storage area, taking out binary BITs of a first binary length IndexLen of each piece of data of the zeroth raw data block, and counting the BITs in the index classification storage area respectively;

step (2.1.4) accumulating and summing the statistical values in the index area IndexArray in turn according to the classification from a starting point, and obtaining a cumulative starting point of each kind of data where the data is stored in sequence;

step (2.1.5) taking out a piece of data from the data area, taking out BITs of a first binary length IndexLen of the piece of data as $ClassNum_m$, searching the classified index classification storage area to find a position thereof after classification, if the data is in a current partition, taking out a next piece of data; and if the data is not in the current partition, taking out the data in the position and putting the data in a position of the next piece of data;

step (2.1.6) repeating the step (2.1.5) to distribute all the data in the zeroth raw data block to a corresponding class;

step (2.1.7) sorting all the data obtained after the classification in step (2.1.6);

step (2.1.8) deleting the duplicate data in the sorted data obtained in step (2.1.7) and marking the zeroth raw data as the processed data block.

4. The method for screening TB-scale of incremental data according to claim 3, wherein the step (2.1.5) comprises: taking the data extracted from the zeroth raw data block as a first data, taking out the BITs of the first binary length IndexLen of the first data and setting the BITs as $ClassNum_m$, and searching the index area table IndexArray [$ClassNum_m$] to obtain A starting position for classifying $ClassNum_m$; if the first data is in the starting position of a current partition, taking out the next piece of data and adding one to the starting position of the classification $ClassNum_m$; and if the first data is not in the starting position of the classification $ClassNum_m$, taking out the data in the starting position and taking the data in the starting position as a second data, putting the first data in a position of the second data, namely a position of a class where the second data belongs, and adding one to the starting position of the classification $ClassNum_m$.

5. The method for screening TB-scale of incremental data according to claim 1, wherein a process of generating the matrix hash index table according to the processed data block in step (2) comprises: setting a hash function for the processed data block, initializing the matrix hash index table, clearing the hash table, taking out the BITs of a hash binary length value generated by each piece of data of the processed data block through the hash function transformation, dividing the data of BITs of the taken hash binary length by a data type length, taking a rounding part as an address of the matrix hash index table, and setting a remainder part to 1 at the corresponding BIT in the matrix hash index table to generate the matrix hash index table.

6. The method for screening TB-scale of incremental data according to claim 1, wherein a process of inter-block indexing and sorting in the step (3) comprises: loading all the raw data blocks, the matrix hash index table and the processed data blocks into the memory, taking out a piece of data from the raw data blocks, generating BITs of a hash binary length value from the piece of data through the hash function, and dividing the taken data of BITs of the hash binary length by the data type length, taking a rounding part as an address of the matrix hash index table, and a remainder part as the corresponding BIT in the matrix hash index table; if BIT is 0, which indicates no duplication, processing data of a next raw data block; if the BIT is 1, which indicates possible duplication, determining whether the data record has already existed by a starting point increment binary search method.

7. The method for screening TB-scale of incremental data according to claim 1, wherein a process of retaining only the sorted non-duplicate processed data blocks in the step (4) comprises: when all the raw data blocks are found to be duplicated in the processed data blocks, discarding the raw data blocks and taking the next raw data block for processing; after searching of all the processed data blocks is completed, the remaining data in the raw data block being the non-duplicate retained data, supplementing the retained data to a tail of the processed data block, and generating a new processed data block and a matrix hash index table after a defined length is satisfied, and generating a last non-full-rank processed data block and a matrix hash index table from the rest; and indexing, classifying and sorting the processed data block with supplemented data and the tail of the non-full-rank processed data block again to generate a new processed data block.

8. An apparatus for screening TB-scale of incremental data, comprising one or more processors for implementing the method for screening TB-scale of incremental data according to claim 1.

9. A computer-readable storage medium on which a program is stored, wherein the program, when executed by a processor, is configured to implement the method for screening TB-scale incremental data according to claim 1.

* * * * *